United States Patent [19]
Hamilton et al.

[11] Patent Number: 5,143,660
[45] Date of Patent: Sep. 1, 1992

[54] METHOD OF CASTING A CONTACT LENS

[75] Inventors: Ronald S. Hamilton, Winchester; William E. Seden, Fareham, both of England

[73] Assignee: National Research Development Corporation, London, England

[21] Appl. No.: 620,722

[22] Filed: Dec. 3, 1990

Related U.S. Application Data

[63] Continuation-in-part of Ser. No. 423,237, Oct. 18, 1989, abandoned.

[30] Foreign Application Priority Data

Nov. 2, 1988 [GB] United Kingdom ............... 8825650
Mar. 2, 1989 [GB] United Kingdom ............... 8904720

[51] Int. Cl.$^5$ .......................................... B29D 11/00
[52] U.S. Cl. .......................................... 264/1.4; 53/485;
156/69; 206/5.1; 264/2.2; 264/2.3; 264/2.5;
264/2.6; 264/2.7; 264/80
[58] Field of Search ............... 264/1.4, 2.2, 2.3, 2.6,
264/2.7, 2.5, 80; 156/69; 206/5.1; 53/485

[56] References Cited

U.S. PATENT DOCUMENTS

| | | | |
|---|---|---|---|
| 3,211,811 | 10/1965 | Lanman | 264/2.3 X |
| 3,251,908 | 5/1966 | Wilenius et al. | 264/1.7 |
| 3,830,460 | 8/1974 | Beattie | 249/134 |
| 3,833,786 | 9/1974 | Brucher | 51/216 LP |
| 3,871,803 | 3/1975 | Beattie | 425/175 |
| 3,894,710 | 7/1975 | Sarofeen | 249/117 |
| 4,208,364 | 6/1980 | Shepherd | 264/2.2 |
| 4,209,289 | 6/1980 | Newcomb et al. | 425/410 |
| 4,211,384 | 7/1980 | Bourset et al. | 249/160 |
| 4,284,399 | 8/1981 | Newcomb et al. | 425/410 |
| 4,347,198 | 8/1982 | Ohkada et al. | 264/2.3 |
| 4,382,902 | 5/1983 | Feurer | 264/1.4 |
| 4,390,482 | 6/1983 | Feurer | 264/1.4 |
| 4,402,659 | 9/1983 | Greenbaum | 425/233 |
| 4,416,814 | 11/1983 | Battista | 264/1.1 |
| 4,571,039 | 2/1986 | Poler | 351/160 H |
| 4,613,330 | 9/1986 | Michelson | 604/890 |
| 4,640,489 | 2/1987 | Larsen | 249/122 |
| 4,761,069 | 8/1988 | Truong et al. | 264/2.3 |
| 4,782,946 | 11/1988 | Pollak | 206/223 |
| 4,865,779 | 9/1989 | Ihan et al. | 264/2.2 |
| 4,955,580 | 9/1990 | Seden et al. | 264/2.2 |

FOREIGN PATENT DOCUMENTS

| | | |
|---|---|---|
| 1133705 | 5/1963 | France . |
| 29627 | 2/1983 | Japan ............... 264/1.4 |
| 84/01297 | 4/1984 | PCT Int'l Appl. . |
| 87/04390 | 7/1987 | PCT Int'l Appl. . |
| 1293765 | 10/1972 | United Kingdom . |
| 1317005 | 5/1973 | United Kingdom . |
| 1317006 | 5/1973 | United Kingdom . |
| 1317007 | 5/1973 | United Kingdom . |
| 1432333 | 4/1976 | United Kingdom . |
| 1511901 | 5/1978 | United Kingdom . |
| 2040213 | 8/1980 | United Kingdom . |
| 2107244 | 4/1983 | United Kingdom . |
| 2185933 | 8/1987 | United Kingdom . |

OTHER PUBLICATIONS

Patent Abstracts of Japan, vol. 8, No. 227 (M-332) [1664], Oct. 18, 1984; & JP-A-59 109,326 (OLYMPUS) Jun. 25, 1984, Abstract.

Primary Examiner—James Lowe
Attorney, Agent, or Firm—Cushman, Darby & Cushman

[57] ABSTRACT

A mould for cast moulding a contact lens comprises a first cup member having a male mould surface and a second cup member with a female mould surface. The two cup members form a piston and cylinder and are used in a pressure vessel so as to apply loading pressure to deflect the mould surfaces to maintain the surfaces in contact with a lens being cast. The mould is opened with the mould surface facing upwardly. Hydrating fluid is added to the first cup member and a cover sealed to the top of the first cup member.

14 Claims, 4 Drawing Sheets

METHOD OF CASTING A CONTACT LENS

This application is a continuation-in-part of parent application Ser. No. 07/423,237, filed Oct. 18, 1989, the parent application has been abandoned.

The invention relates to cast contact lenses and more particularly to apparatus and methods for producing and packaging such cast contact lenses.

BACKGROUND OF THE INVENTION

Cast moulding is a known method for the production of contact lenses. It offers considerable quality and cost advantages over other methods such as lathing and/or spin-casting. It is a highly repeatable process.

During cast moulding it is important to maintain a good seal between the mould pieces in order to prevent the loss of volatile components from monomer used to make the lens and to provide a clean edge profile to the cast lens. Using existing methods the mould pieces are generally held together by mechanical means. However, during curing the mould pieces may relax resulting in uneven sealing loads. It is also difficult to design moulds where sufficient pressure is applied to the mould parts at the seal line between the mould parts so as to separate the monomer in the lens cavity from any excess monomer which is displaced into flash cavities. Imperfectly made seals result in damaged lenses and costly inspection is needed to separate reject from good lenses.

During cast moulding it is also important to compensate for monomer shrinkage which occurs during the polymerising curing process in order to prevent the formation of voids or bubbles in the lens due to cavitation effect. To reduce this problem existing methods are known which provide one of the mould pieces with a flexible rim which collapses during polymerisation. Other systems allow monomer from a reservoir cavity in the mould to flow back into the lens cavity due to suction effect of shrinkage and other systems allow the mould surfaces to move towards one another under suction effect. However, the flexible rim and reservoir methods disturb the seal and reject lenses or lenses requiring edge polishing result. An advantage of mould surface movement over other methods is that it does allow the seal line to be maintained intact but the mould shells must be carefully designed to collapse evenly under suction forces. Variations in mould thickness, material or cure temperature will affect mould stiffness and hence the rate and amount of collapse. The monomer shrinkage induced suction has to overcome the natural stiffness of the mould structure without for example sucking monomer in from a flash cavity around the mould. During cast moulding it is necessary to provide a cavity or cavities within the mould assembly to contain excess monomer squeezed out from the lens cavity as the mould pieces are brought together. This excess monomer forms flash during the curing process and this flash must be separated from the lens prior to packing. In some cases the flash is preferentially fixed to one of the mould pieces by the provision of snatch rings but generally the separation process is carried out manually and is costly.

During cast moulding the lens will, after curing, tend to adhere to one or other of the mould pieces in a random manner unless the moulds are designed to hold the lens on one specific half. There are processing advantages in being able to control or define on which mould half the lens will be held when the mould pieces are separated after curing. Moulds which rely on flexible rims to compensate for monomer shrinkage will tend to retain the lens on the mould piece which has the rim. This is because the rim deflects generally into the lens cavity where the monomer hardens around it. While this process can, to some extent, be relied upon to fix the lens on one half, the net effect of the rim is to deform the edge of the lens resulting in inconsistent edge profiles, reject lenses and edge polishing even of the acceptable lenses i.e. those which have not been damaged by mechanical removal from the retaining mould half. Another method for retaining the lens on one specific mould piece is to create a return on the edge of the lens cavity in such a way as to wedge the hard lens. For example a lens cavity on the concave mould may have a returned edge profile which will retain the hard lens. Unfortunately this creates considerable constraints on the design of the lens edge profile and the creation of relatively thick uncomfortable lens edges.

During the process of cast moulding certain batches may require to be tinted or coloured. There are a number of tinting systems but they require the careful location and support of the lens such that ink or dye can be precisely applied to the lens surface generally the front convex surface without damage to the lens. This positioning of the lens is a labour intensive operation requiring considerable operator skill if rejects are to be minimised.

During the process of cast moulding it may be desirable to carry out some form of work on the lens such as surface treatment. There are cost and quality advantages in carrying out these operations while the lens is still captive on one of the mould pieces but it is necessary to be able to guarantee on which mould half the lens is retained.

During the process of cast moulding the lens is handled in a number of different containers as it undergoes inspection, power measurement, extraction, hydration and transfer to the final pack, generally a glass vial. There can be cost and quality advantage if these operations can be carried out in the mould which is also a main component in the final pack. There are also advantages if the mould piece forming part of the pack is of such design that the lens is properly orientated and accessible for ease of removal by the user. This may be achieved by offering the lens with the convex surface uppermost. Alternatively there may be advantage in providing a "basket" or carrier device within the pack which contains the lens and which is accessible to the user thereby making lens removal from the pack easy.

During cast moulding it is extremely important to protect the optical surfaces of the mould pieces since the slightest damage mark will be transferred to the lens resulting in a reject. Damage can occur for example when the mould is ejected from the moulding machine. Similarly for hygiene reasons it is important to minimise the possibility of an optical surface coming into contact even with soft objects.

It is an object of the present invention to provide improved apparatus and methods for cast moulding contact lenses. It is also an object to provide an improved contact lens and an improved packaged contact lens.

It is a further object of the present invention to provide an improved method and apparatus in which the cast lens is supported on the male mould surface when opened and an effective package is formed by sealing the lens in a container formed by part of the mould.

SUMMARY OF THE INVENTION

The present invention provides a method of cast moulding a contact lens comprising polymerising a monomer in a mould cavity between a male mould surface in a first mould part and a female mould surface in a second mould part, opening the mould to expose the cast lens while supported on said male mould surface, and sealing the lens in a package by sealing a cover member onto said first mould part.

Preferably monomer is fed to said mould cavity while the female mould surface is facing upwardly, and inverting the mould so that on opening the mould said male surface is facing upwardly.

The invention includes a mould for use in a method as aforesaid, which mould comprises a first mould part having a male mould surface and a second mould part having a female mould surface, each of said mould parts having a base on which the respective mould surface is formed and an annular wall extending upwardly from the base, the annular walls of the first and second mould parts being arranged to engage each other as a sliding fit whereby the two mould parts may be moved as a piston and cylinder device to open and close the mould.

Preferably the male mould surface is formed on the base of said first mould part spaced inwardly from the annular wall of the first mould part so as to provide a trough within the annular wall surrounding said male mould surface.

The present invention also provides a method of cast moulding a contact lens comprising polymerising a monomer in a mould having a mould cavity between relatively movable male and female mould surfaces and a rigid shoulder for forming a peripheral seal between the two mould surfaces to close the cavity, at least one of the mould surfaces being flexible under a loading pressure, said method being characterised by closing said mould cavity with monomer filling the cavity, applying a superatmospheric pressure in a pressure vessel so that said loading pressure acts on the mould surfaces and forms a pressurised seal around said rigid shoulder, subsequently curing the monomer whereby said loading pressure causes deflection of one of the mould surfaces maintaining the surfaces in contact with the lens monomer as it shrinks during polymerisation.

Preferably the male and female mould surfaces are formed on respective mould parts arranged to engage each other as a sliding piston and cylinder device, said application of the superatmospheric pressure being applied to both mould parts thereby urging the male and female mould surfaces towards each other.

The invention also includes a method of cast moulding a contact lens comprising polymerising a monomer in a mould cavity between a male and female mould surface, opening the mould to expose the cast lens while supported on one of the mould surfaces, perforating the lens by application of laser beams from an excimer laser to provide a controlled porosity of the lens, applying a drug or other medication to the lens so that the dosage taken up by the lens is determined by the extent of porosity formed and the concentration of the drug or medication, and sealing the lens in a package by sealing a cover member onto the part of the mould supporting said lens.

The present invention also provides apparatus for cast moulding a contact lens by a method as aforesaid. Said apparatus preferably comprises a two-part mould wherein a male mould surface is provided in a cup member and the female mould part is provided on a piston member slidable within said cup member. Preferably the cup member is provided with an outwardly projecting flange such that the upper surface of the male mould member lies below the level of the flange whereby a cover may be sealed onto said flange after formation of the lens so that the lens is supported on the male mould surface below said cover.

BRIEF DESCRIPTION OF THE DRAWINGS

Some embodiments of the invention will now be described by way of example and with reference to the accompanying drawings in which.

DESCRIPTION OF THE PREFERRED EMBODIMENTS

Figure 1:
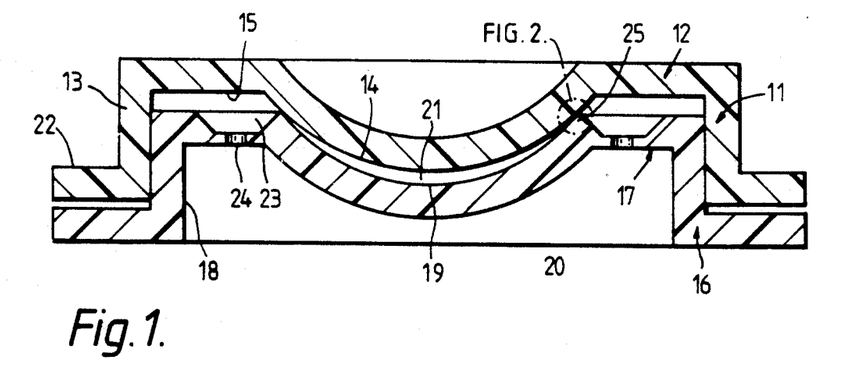
FIG. 1 shows a cross-section of a mould assembly prior to location in a pressure vessel for use in accordance with the present invention.

This example relates to the formation of a cast contact lens by polymerising a monomer in a mould cavity between a male mould surface in a first mould part and a female mould surface in a second mould part. In the drawings the first mould part 11 comprises a cup member having a base 12 surrounded by an annular wall 13. The male mould surface 14 is formed centrally on the base 12 spaced away from the annular wall 13 so that an annular trough region 15 is formed between the annular wall 13 and the male mould surface 14. The second mould part 16 is also cup shaped in that it has a base 17 surrounded by an annular wall 18. The female mould surface 19 is formed centrally on the base region 17 and is again spaced away from the annular wall 18 by a flat annular region 20. The annular wall 18 of the second mould part 16 is arranged to form a close sliding fit inside the annular wall 13 of the first mould part 11. In this way the two mould parts may be fitted together as shown in FIG. 1 forming a piston and cylinder device in which the two mould parts are slidable relative to each other in order to open or close the mould. The male mould surface 14 is arranged to face into the cup of the first mould part whereas the female mould surface 19 faces out of the cup of the second mould part so that when the two mould parts are fitted together as shown in FIG. 1 a mould cavity 21 is formed between the male and female mould surfaces. The annular wall 13 of the first mould part 11 has an annular flange 22 at the end of the annular wall 13 remote from the base 12.

Figure 2:
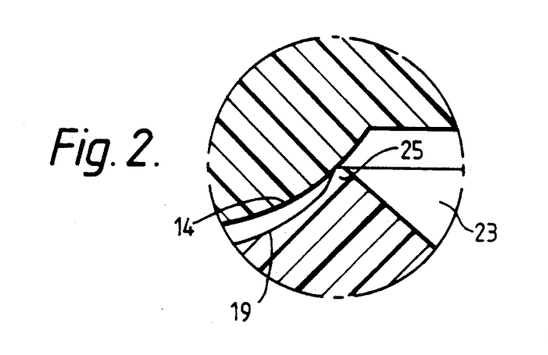
FIG. 2 shows an enlarged view of a seal between the two mould parts of the apparatus shown in FIG. 1.

The wall members forming the male mould surface 14 and female mould surface 19 are sufficiently rigid that they do not substantially deflect under suction caused by shrinkage of monomer within the cavity 21 but can be deflected to keep in contact with shrinking monomer on application of a selected loading pressure which can be achieved by applying superatmospheric pressure to the mould halves in a pressurised oven or other pressure vessel. The female mould surface 19 is surrounded by a rigid shoulder 25 shown more clearly in FIG. 2. The rigid shoulder 25 abuts the male mould surface 14 to form a reliable seal between the two mould surfaces and one which does not distort or deflect during the polymerisation operation when pressure is applied to the two mould halves.

The mould pieces shown in FIG. 1 are in this example injection moulded from a suitable plastic material such as polypropylene.

In use liquid monomer is supplied into the concave surface of the female mould surface 19 while the surface is facing upwardly. The upper mould half is then closed downwardly onto the lower mould half as shown in FIG. 1 until the male surface 14 touches the rigid shoulder 25 with the male mould half 11 uppermost. Any excess liquid monomer is squeezed out between the optical surfaces of the male and female mould parts into the circular trough 23 so as to drain through the holes 24.

Figure 3:
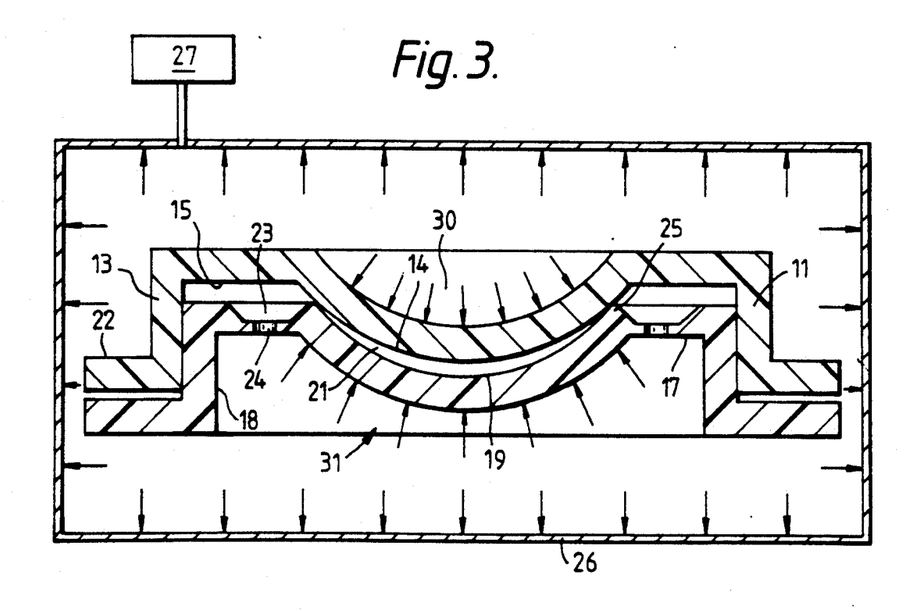
FIG. 3 shows the mould assembly of FIG. 1 when located in a pressure vessel.

The assembly is then placed into a pressure vessel 26 as shown in FIG. 3. Pressure inside the vessel is then increased by application of pressure from a source 27 of pressurised gas so that the two mould halves 11 and 16 are urged towards each other. The pressure in the vessel is preferably in the range of 0.2 to 1 bar above atmospheric. In particular the male and female mould surfaces 14 and 19 are urged towards each other by the applied pressure as indicated by arrows 30 and 31. The engagement force between the two mould halves is concentrated adjacent the shoulder 25 due to the relatively small surface area of engagement and thereby an effective seal is produced. This seal results in a clean edge to the lens and forms a barrier preventing escape of volatile components from the lens monomer in the mould cavity. Furthermore, this application of superatmospheric pressure inside the vessel 26 ensures that a satisfactory loading pressure is applied to the male and female mould surfaces 14 and 19 so that they are caused to deflect as the lens monomer shrinks in volume during polymerisation. In this way the optical surfaces of the male and female mould parts remain in contact with the monomer as it changes from liquid through gel to a solid. This avoids the problem of cavitation of the monomer as it shrinks. In this way the applied superatmospheric pressure creates a more effective seal and causes the mould surfaces to deflect and remain in contact with the monomer in a way which would not have been possible relying upon suction forces from the shrinkage of the monomer alone. The design, thickness and process control necessary in making the wall thicknesses for the male and female mould parts of this embodiment are much less sensitive as their resistance to movement does not need to be made to match the suction effect of the shrinking monomer. The resistance to movement of the mould parts is overcome by the applied superatmospheric pressure effect which may be easily controlled to achieve the desired deflection found necessary in use.

The optical surface of the male mould surface 14 has in this example been flame-treated, a process which improves the surface finish and raises the surface energy. This ensures that the polymerised lens remains in contact with the convex male mould part for subsequent processing.

As described above the mould halves are urged together under the application of superatmospheric pressure. This pressure ensures that one or both mould halves flex and move towards the other as the monomer shrinks during polymerisation.

Figure 9:
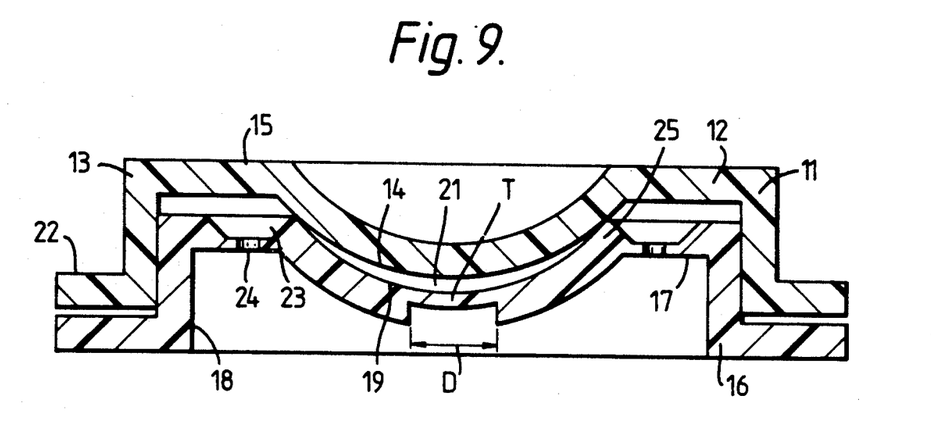
FIGS. 9 and 10 show alternative mould assemblies in cross-section for the moulding of more complex lens in accordance with the present invention.
Figure 10:
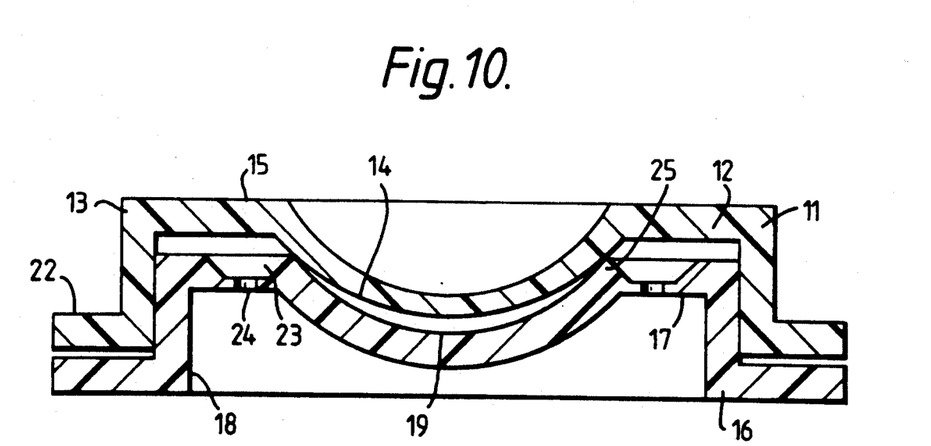

In FIG. 9 an alternative mould assembly is shown. Like parts in FIGS. 9 and 10 are designated by like reference numerals in FIGS. 1 to 8. The second mould part 16 has a centrally located portion of the base region 17 reduced in thickness to a thickness T. The centrally located portion of diameter D includes that part of the base region 17 on which the female mould surface 19 is formed. By reducing the thickness of a portion of the base region this would have the result of concentrating all the mould flexure and movement into this area and, depending upon T and D, inducing an additional (more minus) optical power in the centre of the lens. In this manner concentric bifocal lenses may be formed. In a similar manner, by careful selection of the position of the portion of the base region 17 to be reduced in thickness, a variety of different bifocal lens may be made.

A further alternative mould assembly is shown in FIG. 10. In this embodiment the base 12 of the first mould part 11 provides the male mould surface 14 and is of constantly varying cross-sectional thickness. As shown in FIG. 10 the thickness of the base 12 gradually decreases towards the centre of the male mould surface 14. The thickness of the base 12 at any one point on the male mould surface 14 will determine the flexure and hence the shape induced at that point of the forming lens and so may be used to provide an approximately elliptical lens which is used in some, particularly rigid lens, designs.

Figure 4:
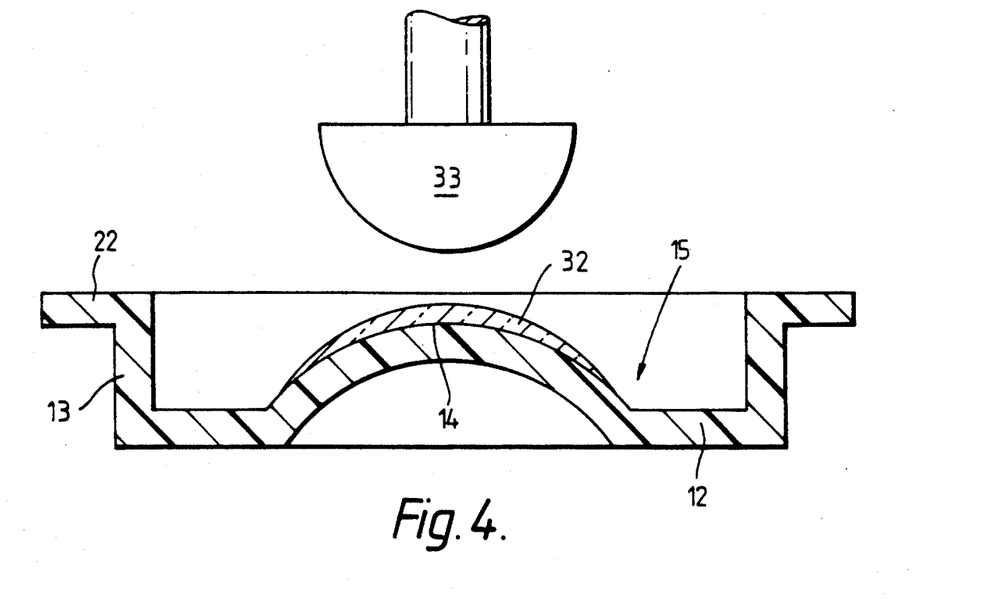
FIG. 4 shows a first part of the mould assembly of FIG. 1 with a cast lens after inversion and the mould is opened.

After treatment in the pressurised oven 26 shown in FIG. 3, the mould is inverted and the two halves separated. The mould half 12 is removed so that as shown in FIG. 4, the cast lens 32 remains on the male mould surface 16 in the cup member 13 below the level of the flange 14. In this way the cast lens is conveniently held with its outer optical surface exposed for any further treatment steps. In the example shown in FIG. 4 an optional printing head 33 is located above the cast lens so that any print treatment can be effected on the outer lens surface. The subsequent processing when the lens is held in the position shown in FIG. 4 may additionally or alternatively include application of tint or colour to the front surface of the lens. The front surface of the lens 32 in this sense is the convex surface. As can be seen from FIG. 4, the annular wall 13 of the mould part 11 extends upwardly to a height above the male mould surface 14 so that when the mould is opened the flange 22 at the upper end of the annular wall 13 lies above the lens 32 formed on the male mould surface. As the lens is held within the cup 13, the mould and lens can be accurately positioned without risk of damage which might occur if the lens were separate from the mould. The cup 13 provides an effective receptable for extraction and/or hydration fluids which may serve to ease the lens non-traumatically from the optical mould surface. The mould and hence the lens can be handled efficiently by automatic processing equipment without risk of damage to the fragile lens. Furthermore the lens is suitably positioned in FIG. 4 for laser drilling or other working.

After any surface treatment has been carried out, the lens 32 is hydrated while still held in the cup 13. This involves filling the trough region 15 in the cup with saline solution and requires no handling of the lens itself. As the problems of cavitation during monomer shrinkage and flash removal around the edge are avoided by the present invention, the process produces high quality lenses such that sampling inspection techniques can be applied in preference to repeated 100% lens inspection which is normal in the lens industry. This will result in lower cost lenses of at least equal quality to those produced in inspection intensive processes.

Figure 5:
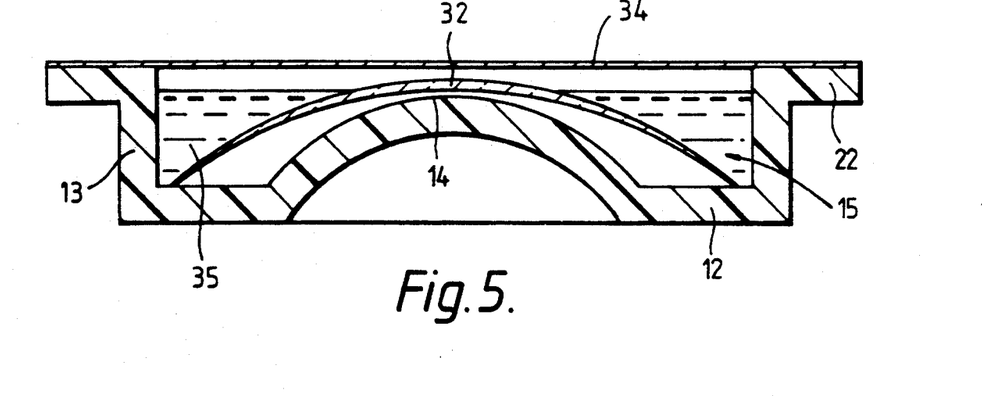
FIG. 5 shows a sealed package with a hydrated cast lens formed in accordance with the invention.

Finally a removable lid 34 is sealed onto the flange 22 of the mould part 11 so that the lens 32 and saline solution 35 are sealed within the package. Both the lid material and the seal have sufficiently good barrier properties to ensure that the packaging solution does not deteriorate over a substantial time. The materials selected for the package shown in FIG. 5 are capable of withstanding conditions of sterilisation such as autoclaving.

In use, the lid 34 may be peeled away from the cup member holding the lens 32. When the lid is removed the saline solution may be poured out of the package and this may be done leaving the lens 32 held in position on the male mould surface 14. This is particularly advantageous in that the orientation of the lens is therefore predetermined in relation to the package position and makes it much simpler to extract the lens in a known orientation. This avoids the need to tip the lens out of the container into an unknown orientation before picking up the lens for insertion into the eye. Furthermore the external face of the lens is facing upwardly in the package and consequently can be touched by hand without contaminating the lens before putting it into the eye.

The provision of the annular trough 15 around the male mould surface 14 also assists in removing the cast lens from the package in that it provides sufficient space around the lens to assist a user in getting hold of the lens in order to remove it from the package.

Figure 6:
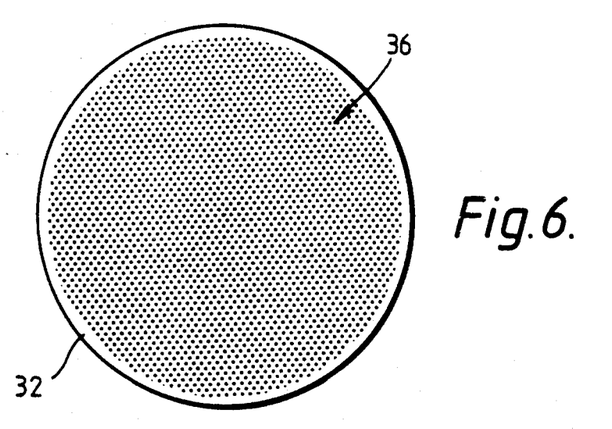
FIGS. 6, 7 and 8 show alternative perforated lenses in accordance with the invention.
Figure 7:
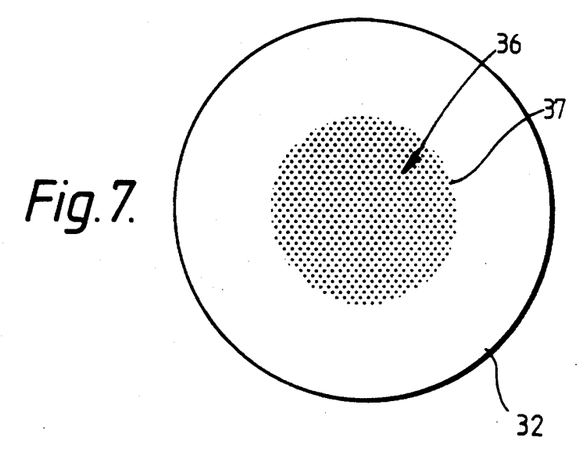
Figure 8:
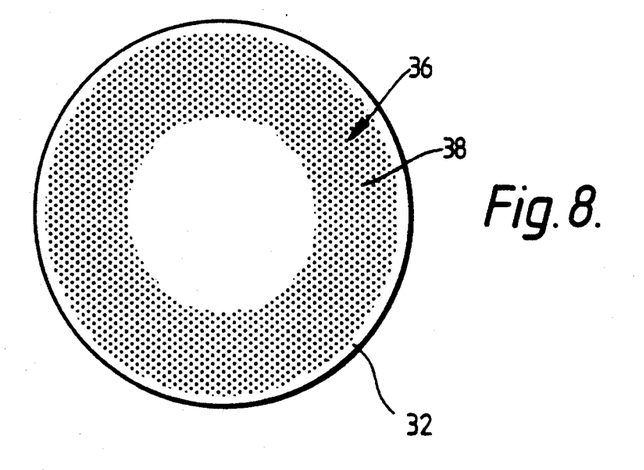

As already described, the lens may be subject to perforation by a plurality of fine holes by application of a laser beam such as a short wavelength excimer laser beam. Such laser beams break the chemical bonds and are able to perforate the cast lens without melting or causing flow or debris or other thermal effects. This process is known as photoabulation decomposition. It is achieved by application of laser beams of short wavelength during short pulse durations. These form perforations which avoid any burr or ragged edge to the holes or grooves in the lens since they would cause unacceptable discomfort to the wearer of the lens. FIGS. 6, 7 and 8 show alternative perforation patterns which may be formed by use of an excimer laser. Such perforations may be beneficial in improving the oxygen transmission or permeability of the lens. The number and position of the holes or grooves will alter the oxygen flux, tearflow, durability and wettability characteristics of the final lens. The lens designer may therefore optimise the performance of the lens by suitable formation of perforations. In this example the holes 36 formed by the laser beam are each square holes approximately 150 microns in size. They may be used to cover the whole lens area stopping short of the periphery thereby maintaining the integrity of the lens edge as shown in FIG. 6. Alternatively they may be formed in the central optical area 37 only as shown in FIG. 7. Alternatively they may be formed in non-optical areas in an annular region 38 outside the central optical area but terminating short of the periphery as shown in FIG. 8. The holes or grooves may be formed in the dry lens prior to hydration or alternatively in the wet lens after hydration.

The treatment stage prior to sealing the package as shown in FIG. 5 may include dosing the lens with medication while the lens is held in the exposed position shown in FIG. 4. By perforating the lens with an excimer laser as already described, the lens may act as a drug sponge in which the quantity of medication absorbed depends on the degree of perforation of the lens and the strength of the medication supplied to the cup in which the lens is supported. The lens may be treated so as to form a controlled degree of perforation with absorption of a controlled drug quantity so that when sealed as in FIG. 5 the package comprises a controlled dosed lens. In this way controlled doses of drugs may be prepackaged in the disposable lens format.

The formation of perforations as described in FIGS. 6, 7 and 8 by use of an excimer laser may be applied to cast contact lenses which are made by processes and apparatus different from that described with reference to FIGS. 1 to 5 and 9 and 10.

The present invention is advantageous in permitting the use of monomers which require ultraviolet curing or other non-thermal curing as well as monomers which are cured by heat treatment. It will be understood that when using heat treatment to effect curing, the mould surfaces develop a lower resistance to deflection during shrinkage of the monomer. However, when using monomers which do not require thermal curing, the mould surfaces will retain a higher resistance to deflection and the forces developed by monomer shrinkage alone would be insufficient to ensure that the mould surfaces remain in contact with the monomer as it shrinks. The use of the applied superatmospheric pressure may however be provided at a controlled extent above atmospheric pressure so as to be sufficient to deflect the mould surfaces and maintain them in contact with the monomer even when no heat treatment is applied as would be the case with ultraviolet curing.

The invention is not limited to the details of the foregoing example.

For instance, both the male and female mould surfaces may be flame polished in order to improve the surface finish on both sides of the lens. In order to release the lens from the mould and control which surface supports the lens after release, the mould may be partially opened to increase the cavity between the male and female surfaces and saline solution passed through the cavity by introducing the solution through one port 24 and exhausting the solution through another port 24 while the mould is tilted. The flow of saline solution will release the lens and by tilting the mould to an upright or inverted position before removal of the saline solution the released lens will come to rest and be supported on either the male surface or female surface as required.

What is claimed is:

1. A method of cast moulding a contact lens comprising the steps of:
    placing a monomer in a mould having a mould cavity between relatively movable male and female mould surfaces, either one of the mould surfaces having a rigid shoulder integral therewith for forming a peripheral seal between the two mould surfaces to close the cavity, at least one of the mould surfaces being flexible under a loading pressure;
    closing said mould cavity with monomer filling the cavity;
    placing the mould in a pressure vessel;
    applying a superatmospheric pressure so that said loading pressure acts on the mould surfaces and forms a pressurized seal around said rigid shoulder; and curing the monomer whereby said loading pressure causes deflection of one of the mould surfaces to maintain the surfaces in contact with the lens as the monomer shrinks during polymerisation.

2. A method according to claim 1 wherein, the step of placing a monomer in a mould comprises:

placing a monomer in a mould wherein, the male and female mould surfaces are formed on respective mould parts arranged to engage each other as a sliding piston and cylinder device, said application of a superatomospheric pressure being applied to both mould parts thereby urging the male and female mould surfaces towards each other.

3. A method of cast moulding a contact lens comprising the steps of:

polymerising a monomer in a mould cavity between a male mould surface in a first mould part and a female mould surface in a second mould part;

opening the mould to expose the cast lens while supported on said male mould surface; and sealing the lens in a package by sealing a cover member onto said first mould part.

4. A method according to claim 1 comprising the steps of:

placing the monomer in the mould cavity while the female mould surface is facing upwardly; and inverting the mould so that on opening the mould said male surface is facing upwardly.

5. A method according to claim 1 comprising the steps of:

opening the mould;

supporting the cast lens on the male mould surface surrounded by a cup member having an annular wall projecting above the lens;

supplying hydrating fluid to the cup member to hydrate the lens while supported on the male surface; and sealing a cover onto the cap member above the lens to form a packaged lens in the cup member.

6. A method according to claim 5 in which the cover member is sealed onto an upper edge of said annular wall.

7. A method according to claim 1 in which said first and second mould parts are slidable relative to each other in engagement as a piston and cylinder device to open and close the mould and in which the first mould part is formed as a cup member having a base surrounded by an upstanding annular wall which engages said second mould part, the male mould surface being formed on said base spaced inwardly from the annular wall to provide a trough into which hydrating fluid is fed to hydrate the lens when the mould is opened.

8. A method according to claim 1 comprising the step of flame polishing the male surface to assist in retaining the lens on the male surface when the mould is opened.

9. A method according to claim 1 comprising the step of flame polishing the female surface to assist in retaining the lens on the female surface when the mould is opened.

10. A method according to claim 1 comprising the step of applying an additional treatment of opening the mould and exposing one mould surface to an additional treatment on the exposed outer lens surface.

11. A method according to claim 10 wherein said additional treatment step consists of tinting, colouring or printing.

12. A method according to claim 10 wherein said additional treatment steps comprises forming of one or more holes through the thickness of the lens by applying a short wavelength laser beam.

13. A method according to claim 12 where said step of forming one or more holes comprising applying an excimer laser beam.

14. A method according to claim 12 in which said step of forming one or more holes comprises forming a plurality of holes to form a controlled porosity of the lens.

* * * * *

UNITED STATES PATENT AND TRADEMARK OFFICE
CERTIFICATE OF CORRECTION

PATENT NO. : 5,143,660
DATED : September 1, 1992
INVENTOR(S) : Hamilton, et. al.

It is certified that error appears in the above-indentified patent and that said Letters Patent is hereby corrected as shown below:

On the title page:

Please change:

"[73] Assignee: National Research Development Corporation, . . ."

to

--[73] Assignee: British Technology Group Ltd, London, England. --

Signed and Sealed this

Fourth Day of June, 1996

Attest:

BRUCE LEHMAN

Attesting Officer  Commissioner of Patents and Trademarks